United States Patent
Caiozza (10) Patent No.: US 6,838,799 B1
(45) Date of Patent: Jan. 4, 2005

(54) LIQUID COOLED DC MOTOR APPARATUS

(76) Inventor: Joseph C. Caiozza, 321 W. Market St., Long Beach, NY (US) 11561

( * ) Notice: Subject to any disclaimer, the term of this patent is extended or adjusted under 35 U.S.C. 154(b) by 0 days.

(21) Appl. No.: 10/609,966

(22) Filed: Jun. 30, 2003

(51) Int. Cl.[7] .................................................. H20K 1/04
(52) U.S. Cl. ........................ 310/190; 310/191; 310/192; 310/193; 310/154; 310/254; 310/89
(58) Field of Search ................................. 310/100, 190, 310/191, 192, 193, 154, 86, 254, 261

(56) References Cited

U.S. PATENT DOCUMENTS

| | | | | |
|---|---|---|---|---|
| 3,612,929 A | * | 10/1971 | Volkrodt | 310/190 |
| 4,587,449 A | * | 5/1986 | West | 310/145 |
| 4,885,493 A | * | 12/1989 | Gokhale | 310/190 |
| 4,899,074 A | * | 2/1990 | West | 310/154 |
| 5,886,450 A | * | 3/1999 | Kuehnle | 310/261 |

* cited by examiner

*Primary Examiner*—Thomas M. Dougherty
*Assistant Examiner*—Iraj A. Mohandesi (57) ABSTRACT

A DC motor apparatus includes a motor housing assembly which includes an outer liquid-tight coolant chamber and an inner, armature-reception chamber portion. Pairs of permanent magnet stator magnet modules are housed within the liquid-tight coolant chamber, and shunt members are housed within the liquid-tight coolant chamber between the stator magnet modules. An armature is centrally located in the inner, armature-reception chamber portion. The armature includes at least one pair of armature pole portions which are wound with same-directional windings. A commutator is connected to the armature, and the commutator includes commutator contacts. An adjustable brush advance/retard mechanism includes roller brushes for contacting the commutator contacts. A liquid cooling system includes a coolant pump and a coolant fluid radiator for circulating liquid coolant through the liquid-tight coolant chamber for cooling the stator magnet modules and the shunt members.

17 Claims, 9 Drawing Sheets

LIQUID COOLED DC MOTOR APPARATUS

BACKGROUND OF THE INVENTION

1. Field of the Invention

The present invention relates generally to direct current (DC) electric motors and, more particularly, to DC electric motors with motor-cooling features.

2. Description of the Prior Art

It is well known that DC electric motors give off heat when they operate. With many motors, ambient air is sufficient for cooling the motors. Even a fan blowing ambient air may also provide sufficient cooling. However, for a DC electric motor that performs relatively large amounts of work and generates more heat than can be sufficiently cooled merely by air, it would be desirable if a DC electric motor were provided with a liquid cooling system.

Generally, a conventional DC electric motor has a simple stator, an armature that includes a pair of armature poles wherein one armature pole has a right-handed winding, and the other armature pole has a left-handed winding. Also, such a conventional DC electric motor includes a commutator that has two commutator contacts. Also, a conventional DC electric motor includes sliding brushes.

With the present invention, a number of improvements over a conventional DC electric motor are contemplated. For example, it would be desirable to provide a novel DC electric motor which provides a stator comprised of a plurality of stator magnet modules. It is contemplated that multiple stator magnet modules can provide maximum torque.

With the present invention, instead of employing an armature that has only two armature pole portions, it would be desirable to provide a DC electric motor that has an armature that includes additional armature pole portions. The use of multiple armature pole portions will permit the maximizing of the efficiency of available electric current.

With the present invention, instead of having opposite armature pole portions that have opposite winding configurations, such as right-handed winding and left-handed winding, it has been discovered beneficial to have opposite armature pole portions to have the same winding configurations. That is, both opposite armature pole portions can have either right-handed windings or left-handed windings.

With the present invention, instead of using conventional sliding brushes, the invention employs roller brushes. Roller brushes last longer than sliding brushes.

In addition, instead of employing a conventional bearing for the armature, the present invention provides a tunnel bearing assembly which puts the bearings close to the armature for better stability and load supporting.

Conventionally, brushes are retained in fixed positions with respect to the commutator contacts. That is, even with different motor speeds and different loads, the relative positions between the commutator contacts and the brushes do not change. In this respect, it would be desirable if a brush advance/retard mechanism were provided. Such a brush advance/retard mechanism would allow for maximum performance at different motor speeds and loads.

Thus, while the foregoing body of prior art indicates it to be well known to use DC electric motors, the above discussion indicates that the prior art does not teach or suggest a DC motor apparatus which has the following combination of desirable features: (1) is provided with a liquid cooling system; (2) provides a stator comprised of a plurality of stator magnet modules; (3) has an armature that includes additional armature pole portions; (4) has opposite armature pole portions having the same winding configurations; (5) employs roller brushes; (6) provides a tunnel bearing assembly; and (7) provides a brush advance/retard mechanism. The foregoing desired characteristics are provided by the unique liquid cooled DC motor apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a DC motor apparatus which includes a motor housing assembly which includes an outer chamber portion and an inner, armature-reception chamber portion. At least one pair of stator magnet modules are housed within the outer chamber portion, and at least one pair of shunt members are housed within the outer chamber portion between the stator magnet modules. The stator magnet modules include permanent magnets. An armature is housed in the inner, armature-reception chamber portion, wherein the armature is centrally located with respect to the stator magnet modules, such that the stator magnet modules are arrayed peripherally around the armature. The armature includes at least one pair of armature pole portions, and the at least one pair of armature pole portions are wound with same-directional windings. A commutator is connected to the armature, and the commutator includes at least one pair of commutator contacts. The number of pairs of commutator contacts is equal to the number pairs of the armature pole portions. A brush advance/retard mechanism is supported by the motor housing assembly, and the brush advance/retard mechanism includes roller brushes for contacting the commutator contacts.

The multiple armature pole portions provide maximizing the efficiency of available electric current. The multiple stator magnet modules provide for maximum torque. The brush advance/retard mechanism allows for maximum performance at different motor speeds and loads. The roller brushes last longer than conventional sliding brushes.

Preferably, the DC motor apparatus of the invention includes a liquid cooling system. More specifically, the motor housing assembly includes an outer liquid-tight coolant chamber and the inner, armature-reception chamber portion. The stator magnet modules are housed within the liquid-tight coolant chamber, and the shunt members are housed within the liquid-tight coolant chamber between the stator magnet modules. In addition, housing-to-pump conduits are connected to the liquid-tight coolant chamber. A coolant pump is connected to the housing-to-pump conduits. A pump-to-radiator conduit is connected to the coolant pump. A coolant fluid radiator is connected to the pump-to-radiator conduit, and radiator-to-housing conduits are connected between the coolant fluid radiator and the liquid-tight coolant chamber.

Preferably, the shunt members include at least one north-pole-to-north-pole, module-to-module shunt member and at least one south-pole-to-south-pole, module-to-module shunt member. The same-directional windings of the armature pole portions can include right-handed windings, or the same-directional windings can include left-handed windings.

Preferably, the motor housing assembly includes an outer longitudinal housing portion, an inner longitudinal housing portion, a first transverse housing portion, and a second transverse housing portion. In this respect, the outer longitudinal housing portion, the inner longitudinal housing portion, a portion of the first transverse housing portion, and a portion of the second transverse housing portion define the liquid-tight coolant chamber. In addition, the inner longitudinal housing portion, a portion of the first transverse housing portion, and a portion of the second transverse housing portion define the inner, armature-reception chamber portion.

Preferably, the brush advance/retard mechanism includes a roller brush support plate connected to the motor housing assembly. The roller brush support plate includes plate adjustment slots, and the roller brush support plate includes peripheral plate teeth. Plate guide fasteners are received in the plate adjustment slots and are connected to the motor housing assembly. Roller brush assemblies are connected to the roller brush support plate, wherein the roller brush assemblies include the roller brushes and brush bias springs for biasing the roller brushes against the commutator contacts.

A plate drive assembly, supported by the motor housing assembly, is provided for adjusting the roller brush support plate, wherein the plate drive assembly includes a brush advance/retard gear for engaging the peripheral plate teeth.

Preferably, each stator magnet module includes a plurality of cylindrical magnets, and a plurality of shunt blocks retaining the cylindrical magnets.

With one embodiment of a stator magnet module, the stator magnet module includes a first row of first directional orientation carrier-embedded magnets, a second row of first directional orientation carrier-embedded magnets, a row of third directional orientation carrier-embedded magnets, and a row of fourth directional orientation carrier-embedded magnets. A shunt carrier block is connected between the first row of the first directional orientation carrier-embedded magnets and the row of fourth directional orientation carrier-embedded magnets, wherein the first row of the first directional orientation carrier-embedded magnets is oriented perpendicular to the row of the fourth directional orientation carrier-embedded magnets. A shunt carrier block is connected between the row of the fourth directional orientation carrier-embedded magnets and the second row of the first directional orientation carrier-embedded magnets, wherein the row of the fourth directional orientation carrier-embedded magnets is oriented perpendicular to the second row of the first directional orientation carrier-embedded magnets. A shunt carrier block is connected between the second row of the first directional orientation carrier-embedded magnets and the row of the third directional orientation carrier-embedded magnets, wherein the second row of the first directional orientation carrier-embedded magnets is oriented perpendicular to the row of the third directional orientation carrier-embedded magnets. A shunt carrier block is connected between the row of the third directional orientation carrier-embedded magnets and the first row of the first directional orientation carrier-embedded magnets, wherein the row of the third directional orientation carrier-embedded magnets is oriented perpendicular to the first row of the first directional orientation carrier-embedded magnets.

With another embodiment of a stator magnet module, the stator magnet module includes a row of second directional orientation carrier-embedded magnets, a first row of third directional orientation carrier-embedded magnets, a second row of third directional orientation carrier-embedded magnets, and a row of first directional orientation carrier-embedded magnets. A shunt carrier block is connected between the row of the second directional orientation carrier-embedded magnets and the first row of the third directional orientation carrier-embedded magnets, wherein the row of the second directional orientation carrier-embedded magnets is perpendicular to the first row of the third directional orientation carrier-embedded magnets. A shunt carrier block is connected between the first row of the third directional orientation carrier-embedded magnets and the row of the first directional orientation carrier-embedded magnets, wherein the first row of the third directional orientation carrier-embedded magnets is perpendicular to the row of the first directional orientation carrier-embedded magnets. A shunt carrier block is connected between the row of the first directional orientation carrier-embedded magnets and the second row of the third directional orientation carrier-embedded magnets, wherein the row of the first directional orientation carrier-embedded magnets is perpendicular to the second row of the third directional orientation carrier-embedded magnets. A shunt carrier block is connected between the second row of the third directional orientation carrier-embedded magnets and the second directional orientation carrier-embedded magnets, wherein the second row of the third directional orientation carrier-embedded magnets is perpendicular to the row of the second directional orientation carrier-embedded magnets.

With still another embodiment of a stator magnet module, the stator magnet module includes a first row of second directional orientation carrier-embedded magnets, a second row of the second directional orientation carrier-embedded magnets, a row of fourth directional orientation carrier-embedded magnets, and a row of third directional orientation carrier-embedded magnets. A shunt carrier block is connected between the first row of the second directional orientation carrier-embedded magnets and the row of the fourth directional orientation carrier-embedded magnets, wherein the first row of the second directional orientation carrier-embedded magnets is perpendicular to the row of the fourth directional orientation carrier-embedded magnets. A shunt carrier block is connected between the row of the fourth directional orientation carrier-embedded magnets and the second row of the second directional orientation carrier-embedded magnets, wherein the row of the fourth directional orientation carrier-embedded magnets is perpendicular to the second row of the second directional orientation carrier-embedded magnets. A shunt carrier block is connected between the second row of the second directional orientation carrier-embedded magnets and the row of the third directional orientation carrier-embedded magnets, wherein the second row of the second directional orientation carrier-embedded magnets is perpendicular to the row of the third directional orientation carrier-embedded magnets. A shunt carrier block is connected between the row of the third directional orientation carrier-embedded magnets and the first row of the second directional orientation carrier-embedded magnets, wherein the row of the third directional orientation carrier-embedded magnets is perpendicular to the first row of the second directional orientation carrier-embedded magnets.

With yet another embodiment of a stator magnet module, the stator magnet module includes a row of second directional orientation carrier-embedded magnets, a first row of fourth directional orientation carrier-embedded magnets, a second row of fourth directional orientation carrier-embedded magnets, and a row of first directional orientation carrier-embedded magnets. A shunt carrier block is connected between the row of the second directional orientation carrier-embedded magnets and the first row of the fourth directional orientation carrier-embedded magnets, wherein the row of the second directional orientation carrier-embedded magnets is perpendicular to the first row of the fourth directional orientation carrier-embedded magnets. A shunt carrier block is connected between the first row of the fourth directional orientation carrier-embedded magnets and the row of the first directional orientation carrier-embedded magnets, wherein the second row of the fourth directional orientation carrier-embedded magnets is perpendicular to the row of the first directional orientation carrier-embedded magnets, A shunt carrier block is connected between the row of the first directional orientation carrier-embedded magnets and the second row of the fourth directional orientation carrier-embedded magnets, wherein the row of the first directional orientation carrier-embedded magnets is perpendicular to the second row of the fourth directional orientation carrier-embedded magnets. A shunt carrier block is connected between the second row of the fourth directional orientation carrier-embedded magnets and the row of the second directional orientation carrier-embedded magnets, wherein the second row of the fourth directional orientation carrier-embedded magnets is perpendicular to the row of the second directional orientation carrier-embedded magnets.

A tunnel bearing assembly is provided, supporting the armature, wherein the tunnel bearing assembly includes wire-reception channels.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a number of preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved liquid cooled DC motor apparatus which has all of the advantages of the prior art and none of the disadvantages.

It is another object of the present invention to provide a new and improved liquid cooled DC motor apparatus which may be easily and efficiently manufactured and marketed.

It is a further object of the present invention to provide a new and improved liquid cooled DC motor apparatus which is of durable and reliable construction.

An even further object of the present invention is to provide a new and improved liquid cooled DC motor apparatus which is susceptible of a low cost of manufacture with regard to both materials and labor, and which accordingly is then susceptible of low prices of sale to the consuming public, thereby making such liquid cooled DC motor apparatus available to the buying public.

Still yet a further object of the present invention is to provide a new and improved DC motor apparatus which is provided with a liquid cooling system.

Still another object of the present invention is to provide a new and improved liquid cooled DC motor apparatus that provides a stator comprised of a plurality of stator magnet modules.

Yet another object of the present invention is to provide a new and improved liquid cooled DC motor apparatus which has an armature that includes additional armature pole portions.

Even another object of the present invention is to provide a new and improved liquid cooled DC motor apparatus that has opposite armature pole portions having the same winding configurations.

Still a further object of the present invention is to provide a new and improved liquid cooled DC motor apparatus which employs roller brushes.

Yet another object of the present invention is to provide a new and improved liquid cooled DC motor apparatus that provides a tunnel bearing assembly.

Still another object of the present invention is to provide a new and improved liquid cooled DC motor apparatus which provides a brush advance/retard mechanism.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved liquid cooled DC motor apparatus embodying the principles and concepts of the present invention will be described.

Turning to FIGS. 2–6, there is shown a first embodiment of the liquid cooled DC motor apparatus of the invention generally designated by reference numeral 10. In the first embodiment, liquid cooled DC motor apparatus 10 includes a motor housing assembly 32 which includes an outer chamber portion and an inner, armature-reception chamber portion 35. At least one pair of stator magnet modules are housed within the outer chamber portion, and at least one pair of shunt members are housed within the outer chamber portion between the stator magnet modules. The stator magnet modules include permanent magnets. An armature is housed in the inner, armature-reception chamber portion 35, wherein the armature is centrally located with respect to the stator magnet modules, such that the stator magnet modules are arrayed peripherally around the armature. The armature includes at least one pair of armature pole portions 38, and the at least one pair of armature pole portions 38 are wound with same-directional windings. A commutator 27 is connected to the armature, and the commutator 27 includes at least one pair of commutator contacts 29. The number of pairs of commutator contacts 29 is equal to the number pairs of the armature pole portions 38. A brush advance/retard mechanism is supported by the motor housing assembly 32, and the brush advance/retard mechanism includes roller brushes 56 for contacting the commutator contacts 29.

The multiple armature pole portions provide maximizing the efficiency of available electric current. The multiple stator magnet modules provide for maximum torque. The brush advance/retard mechanism allows for maximum performance at different motor speeds and loads. The roller brushes 56 last longer than conventional sliding brushes.

Preferably, the DC motor apparatus of the invention includes a liquid cooling system. More specifically, the motor housing assembly 32 includes an outer liquid-tight coolant chamber 34 and the inner, armature-reception chamber portion 35. The stator magnet modules are housed within the liquid-tight coolant chamber 34, and the shunt members are housed within the liquid-tight coolant chamber 34 between the stator magnet modules. In addition, housing-to-pump conduits 44 are connected to the liquid-tight coolant chamber 34. A coolant pump 12 is connected to the housing-to-pump conduits 44. A pump-to-radiator conduit 46 is connected to the coolant pump 12. A coolant fluid radiator 14 is connected to the pump-to-radiator conduit 46, and radiator-to-housing conduits 48 are connected between the coolant fluid radiator 14 and the liquid-tight coolant chamber 34.

Figures 12, 13:
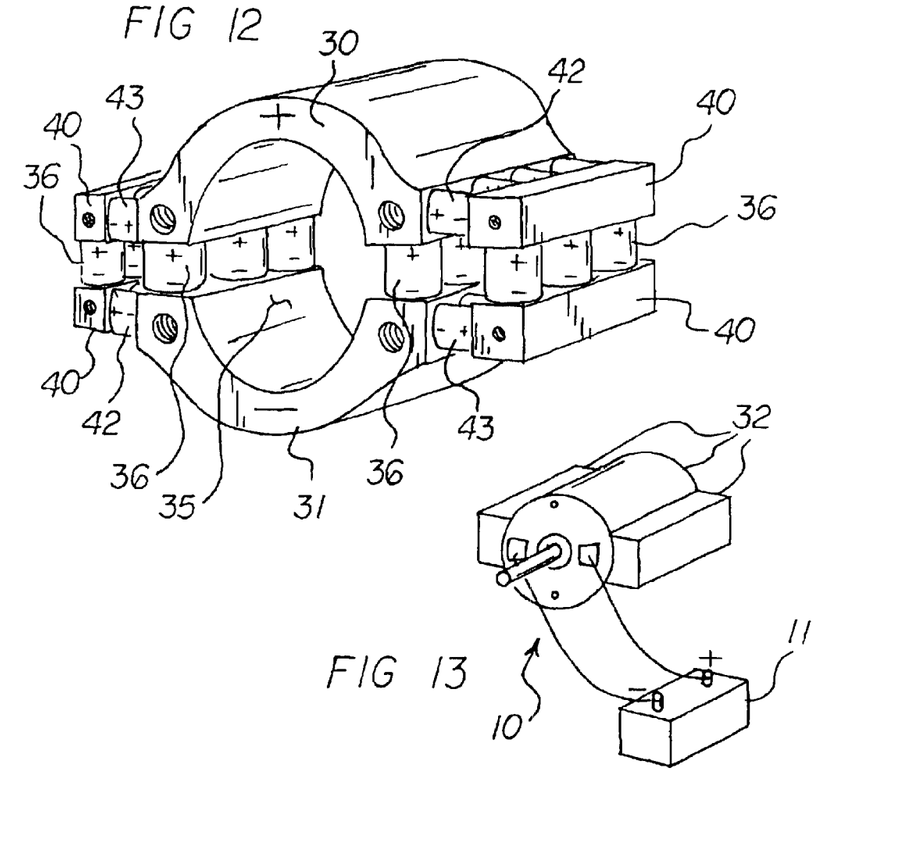
FIG. 12 is a perspective view of a stator assembly of the invention which includes two stator magnet modules.
FIG. 13 is a perspective view showing the stator assembly in FIG. 12 employed in a DC motor that is powered by a battery.

The liquid cooling system for the stator magnet modules and the shunt members provides greater operating efficiency for the DC motor of the invention. More specifically, the liquid cooling permits the use of high powered motors, such as are useful for vehicle propulsion. For vehicle propulsion, a battery 11, such as shown in FIG. 13, is used for powering the DC motor apparatus 10 of the invention.

Preferably, the shunt members include at least one north-pole-to-north-pole, module-to-module shunt member 30 and at least one south-pole-to-south-pole, module-to-module shunt member 31. The same-directional windings of the armature pole portions can include right-handed windings, or the same-directional windings can include left-handed windings. In the drawing figures, an armature pole portion that has a right-handed winding is labelled RH, and an armature pole portion that has a left-handed winding is labelled LH.

Preferably, the motor housing assembly 32 includes an outer longitudinal housing portion 50, an inner longitudinal housing portion 51, a first transverse housing portion 52, and a second transverse housing portion 54. In this respect, the outer longitudinal housing portion 50, the inner longitudinal housing portion 51, a portion of the first transverse housing portion 52, and a portion of the second transverse housing portion 54 define the liquid-tight coolant chamber 34. In addition, the inner longitudinal housing portion 51, a portion of the first transverse housing portion 52, and a portion of the second transverse housing portion 54 define the inner, armature-reception chamber portion 35.

Figure 1:
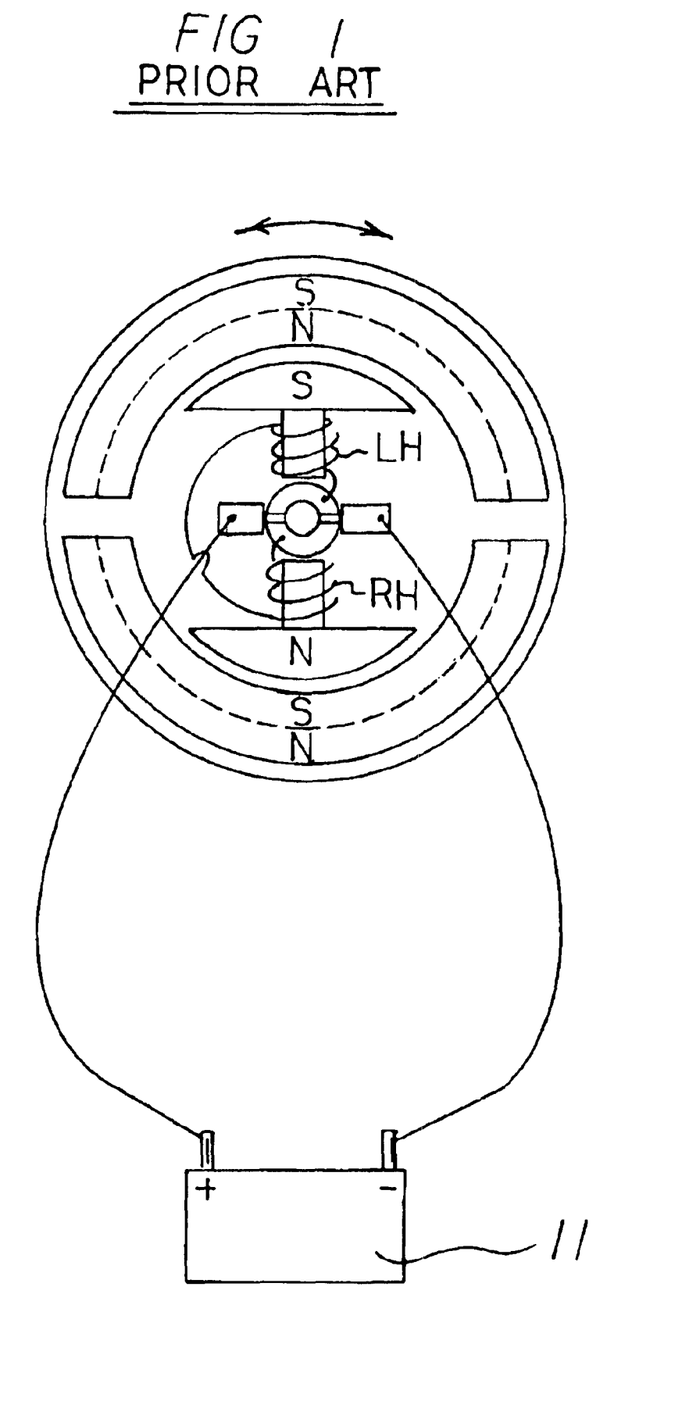
FIG. 1 is a schematic view of a PRIOR ART direct current (DC) powered electric motor.
Figure 2:
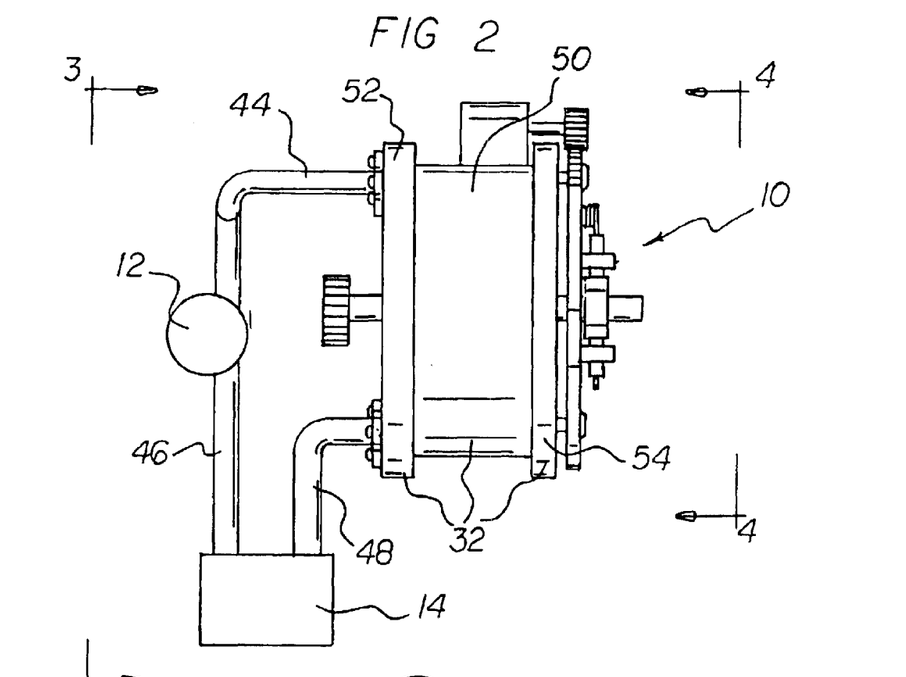
FIG. 2 is a side view of a first embodiment of the liquid cooled DC motor apparatus of the invention.
Figure 3:
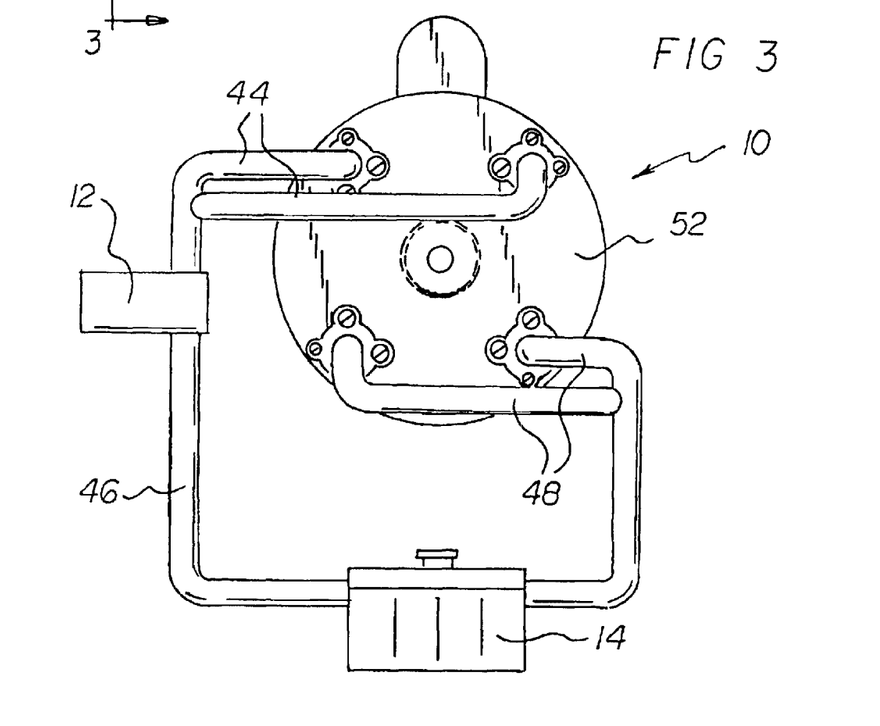
FIG. 3 is a front view of the embodiment of the liquid cooled DC motor apparatus of FIG. 2 taken along line 3—3 thereof.
Figure 4:
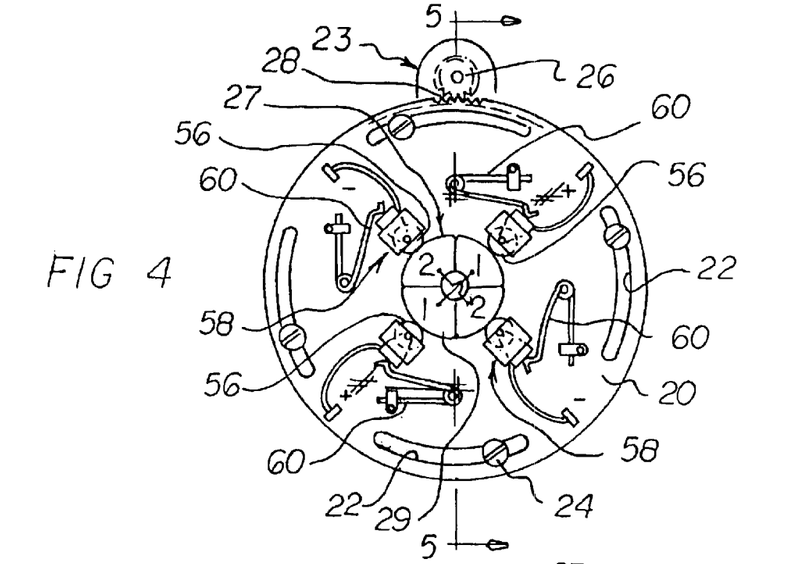
FIG. 4 is a rear view of the embodiment of the liquid cooled DC motor apparatus of FIG. 2 taken along line 4—4 thereof.

As shown in FIGS. 2 and 3, the liquid cooling system operates when the DC motor apparatus 10 of the invention is fully assembled. The shunt members and the stator magnet modules are contained in the liquid-tight coolant chamber 34. The coolant pump 12 pumps a liquid coolant, such as a vehicle antifreeze solution, through the housing-to-pump conduits 44, and past the shunt members and the stator magnet modules, whereby the liquid coolant picks up heat from the shunt members and the stator magnet modules. The heated liquid coolant then flows through the radiator-to-housing conduits 48 and through the coolant fluid radiator 14 at which heat exchange with ambient air takes place, and the liquid coolant is cooled by the ambient air that contacts the coolant fluid radiator 14. Then, the cooled liquid coolant flows through the pump-to-radiator conduit 46, and the liquid coolant recycles as long and the coolant pump 12 operates.

With the DC motor apparatus 10 of the present invention, the number of sets of stator magnet modules determines the number of commutator contacts 29 that are needed for each set of armature pole portions 38. For example, with an armature having one set of armature pole portions 38, along with one set of stator magnet modules, there are two commutator contacts 29 for the one set of armature pole portions 38. As another example, for an armature having one set of armature pole portions 38, along with two sets of stator magnet modules, there are four commutator contacts 29 for the one set of armature pole portions 38.

Stated somewhat differently, the formula is to add another whole set of commutator contacts 29 to the original contacts for each new set of N+S permanent magnets added (that is for each new set of stator magnet modules added), plus another set of roller brushes 56. Each new set of N+S permanent magnets added, acts as if it is an additional motor, so a new set of contacts on the commutator 27 must be added, plus a new set of roller brushes 56 evenly spaced around the commutator 27. If one starts with a one set of N+S permanent magnet motor, each set of commutator 27 are sequentially numbered to coincide with the number of the poles of the armature, that is called the first set of commutator contacts 29. When the next set of N+S permanent magnets are added, a new second set of commutator contacts 29 are added to the commutator 27, that are also sequentially numbered, and must be wired (connected) to the same number position of the first set of contacts. For a three pole armature, the contacts on the commutator 27 are 1 is connected to 1, 2 is connected to 2, 3 is connected to 3, etc. In addition, a new set of brushes is to be added, so that they are equally distanced around the commutator 27, and so on.

With respect to the number of roller brushes 56, the number of roller brushes 56 is determined by the number of sets of stator magnet modules. For example, one set of stator magnet modules requires two roller brushes 56; two sets of stator magnet modules requires four roller brushes 56; and three sets of stator magnet modules requires six roller brushes 56.

Another way to make a DC motor apparatus 10 of the invention is to use just two roller brushes 56 connected 90 degrees apart. If another set of permanent magnets were added, the brushes would be 45 degrees apart, and so on. Because the same sequentially numbered contacts are connected together, an extra set of brushes is not needed. With the smaller number of brushes and small width of the surface area of the increased number of commutator contacts 29, the diameter of the commutator 27 would have to be increased, so that the surface area of the contacts would be restored, and full electrical saturation of the pole windings can take place. Even if the motor were built with the proper number of brushes, the increased diameter of the commutator 27 would help to saturate the pole windings at high speed revolutions of the armature.

The limit of stator magnet modules is determined by the physical size of the DC motor apparatus 10 and the size of the stator magnet modules.

Considering an armature having three armature pole portions 38, there are three commutator contacts 29 for each set of stator magnet modules. Three commutator contacts 29 have to be added for each new set of stator magnet modules. That is, there are six commutator contacts 29 required when there are two sets of stator magnet modules employed. The general rule is to add another whole set of commutator contacts 29 to the original commutator contacts 29 for each new set of stator magnet modules that are added.

Figure 10:
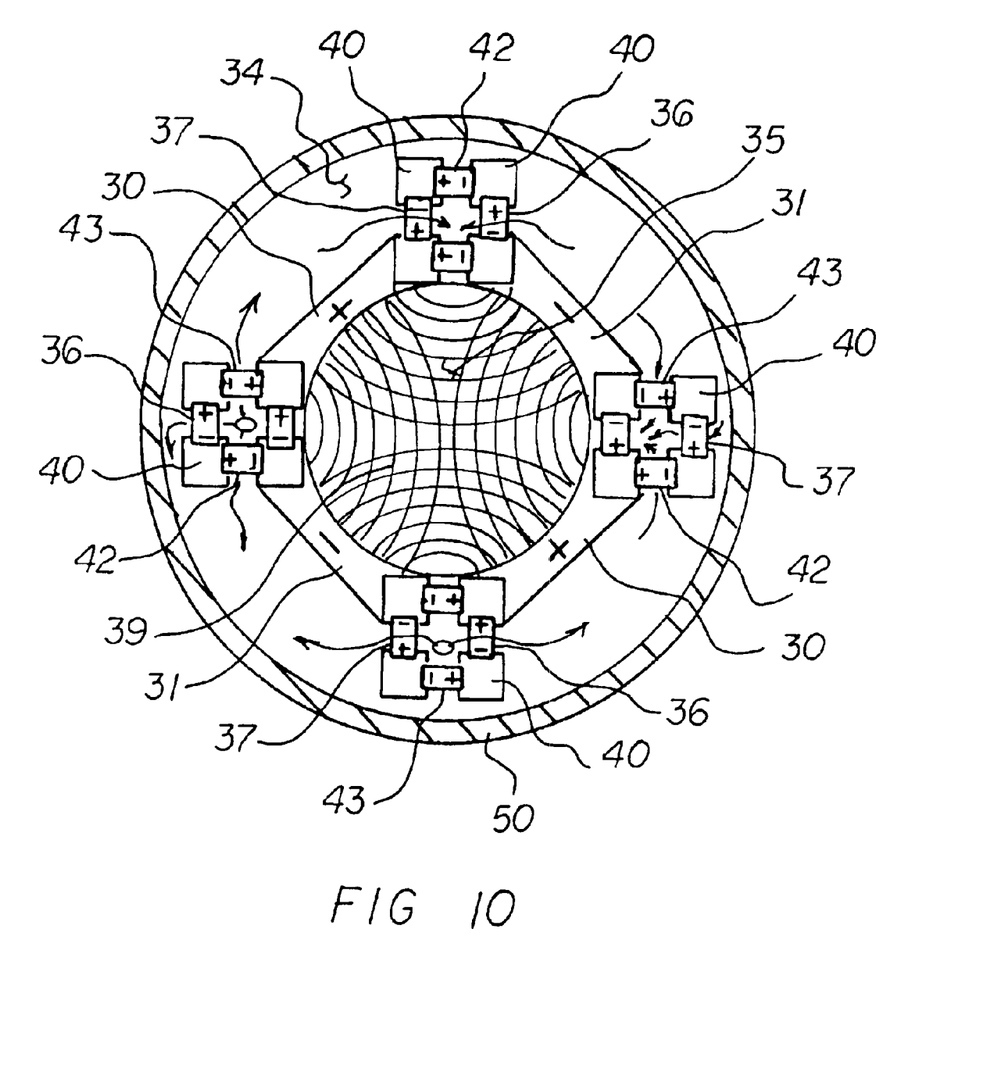
FIG. 10 illustrates an intense magnetic flux pattern provided by four stator magnet modules of the invention.
Figure 11:
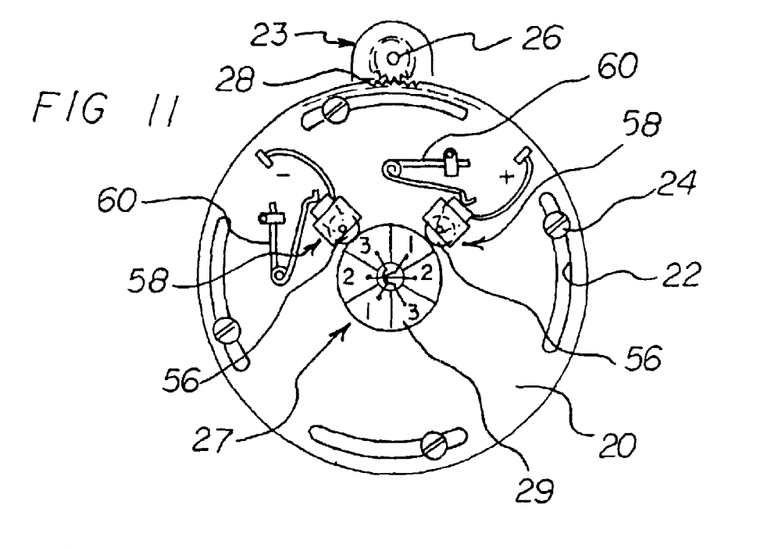
FIG. 11 is a rear view of a fourth embodiment of the invention which includes an armature having three armature winding portions and two roller brush assemblies.

For purposes of convenience, the North pole of a magnet is indicated in the drawings by a plus sign (+), and the South pole of a magnet is indicated in the drawings by a minus sign (−). Generally, a magnet has a North pole and a South pole, that is, generally a magnet has a North magnetic flux and a South magnetic flux. It is noted with interest, however, that the north-pole-to-north-pole, module-to-module shunt member 30 has a pure North magnetic flux, and the south-pole-to-south-pole, module-to-module shunt member 31 has a pure South magnetic flux. Moreover, all of the flux fields stay within the motor because of the pure attraction of the North and South flux fields to each other, making the flux fields 38 more powerful, as shown in FIG. 10.

Figure 5:
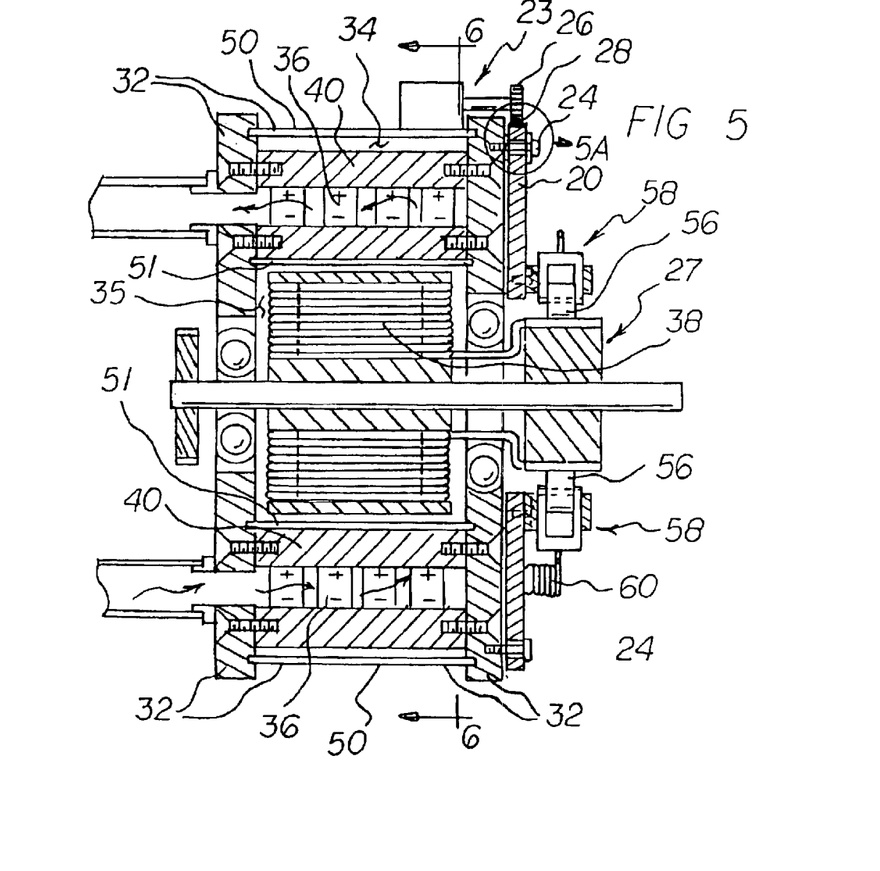
FIG. 5 is a cross-sectional view of the embodiment of the invention shown in FIG. 4 taken along 5—5 thereof.
Figure 5A:
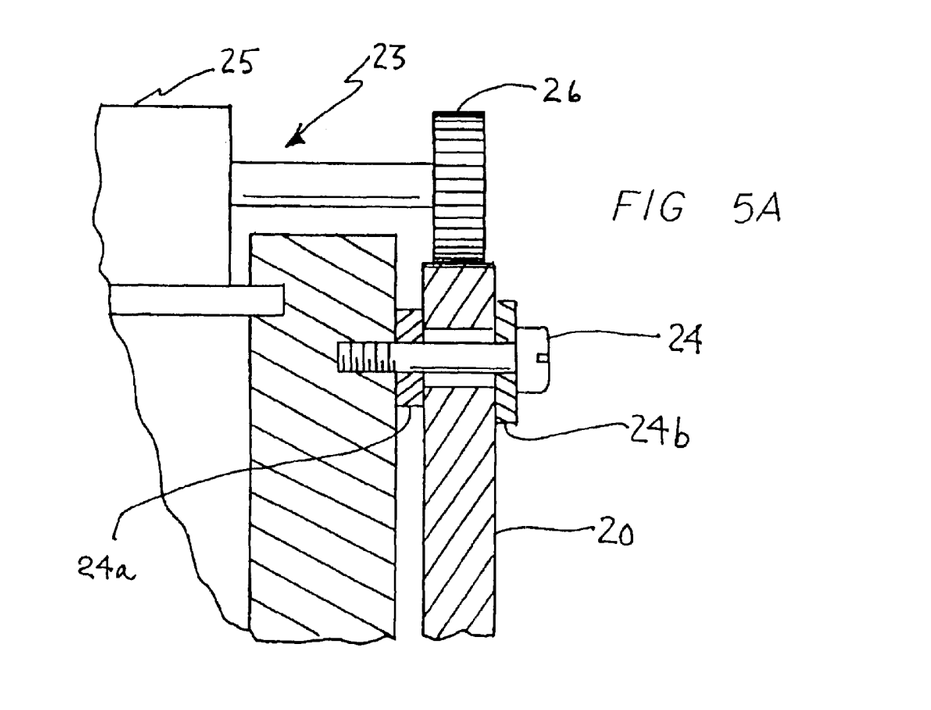
FIG. 5A is an enlarged fragmentary view of the portion indicated in FIG. 5 by circle 5A.
Figure 5B:
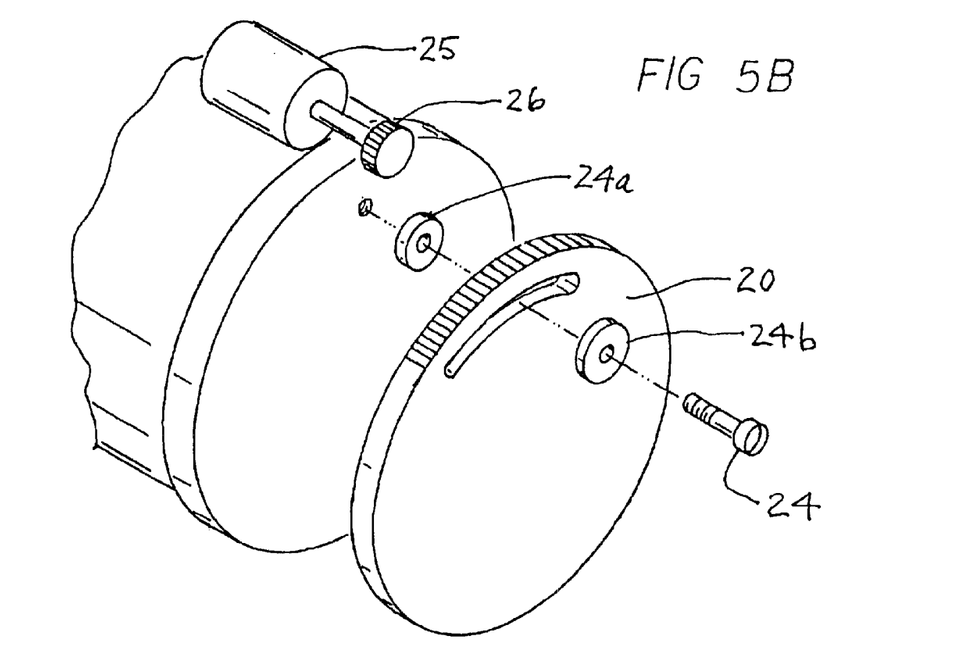
FIG. 5B is a schematic assembly view of the fragmentary portion of FIG. 5A.

Preferably, the brush advance/retard mechanism includes a roller brush support plate 20 movably connected to the motor housing assembly 32. The roller brush support plate 20 includes plate adjustment slots 22, and the roller brush support plate 20 includes peripheral plate teeth 28. Plate guide fasteners 24 are received through the plate adjustment slots 22 and are connected to the motor housing assembly 32 substantially as shown (FIGS. 5A and 5B). Roller brush assemblies 58 are connected to the roller brush support plate 20, wherein the roller brush assemblies 58 include the roller brushes 56 and brush bias springs 60 for biasing the roller brushes 56 against the commutator contacts 29.

A plate drive assembly 23, supported by the motor housing assembly 32, is provided for movably adjusting the angular position of roller brush support plate 20, wherein the plate drive assembly 23 includes a small electric servo motor 25 for driving a brush advance/retard gear 26 which, in turn, engages the peripheral plate teeth 28.

The brush advance/retard mechanism is operated to have a similar effect as the spark retard and advance mechanism of an internal combustion engine. With respect to the DC motor apparatus 10 of the invention, such a motor works most efficiently when the power pulse is delivered to match the conditions. For example, when the motor starts to pull, the power pulse is delivered at a different (usually retarded) time. Conversely, when the motor is operating at a high speed, the power pulse is delivered with different timing (usually advanced). Generally, the brush advance/retard mechanism is operated to control the relationship of the brushes to the permanent magnets.

More specifically, to adjust the brush advance/retard mechanism, the brush advance/retard gear 26 is operated to move the peripheral plate teeth 28, thereby moving the roller brush support plate 20 around the commutator 27. When the roller brush support plate 20 is so moved, the plate guide fasteners 24 ride in the plate adjustment slots 22. Spacer 24a and washer 24b help to suitably slidably support the brush support plate 20 relative to housing 32. The operation of the brush advance/retard gear 26 by servo motor 25 preferably is precisely controlled by a conventional computerized electronic speed controller the details and operation of which are well known and outside the scope of the present invention.

With respect to cooling features of the DC motor apparatus 10 of the invention, as stated above, the motor housing assembly 32 defines the liquid-tight coolant chamber 34. The housing-to-pump conduits 44, the coolant pump 12, the pump-to-radiator conduit 46, the coolant fluid radiator 14, and the radiator-to-housing conduits 48 provide a closed, liquid-tight region in which liquid coolant is pumped through the liquid-tight coolant chamber 34 to pickup heat from the motor, pumped through the coolant fluid radiator 14 to radiate heat and have heat exchanged with the ambient environment, and pumped back into the liquid-tight coolant chamber 34 after heat has been removed from the liquid coolant at the coolant fluid radiator 14.

Preferably, each stator magnet module includes a plurality of cylindrical magnets, and a plurality of shunt blocks 40 retaining the cylindrical magnets.

Figure 6:
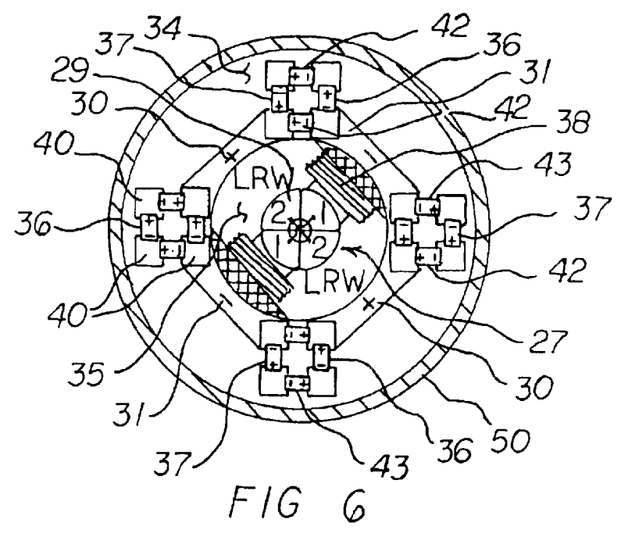
FIG. 6 is a cross-sectional view of the embodiment of the invention shown in FIG. 5 taken along line 6—6 thereof, wherein the armature includes two armature winding portions and wherein the stator includes four stator magnet modules.
Figure 7:
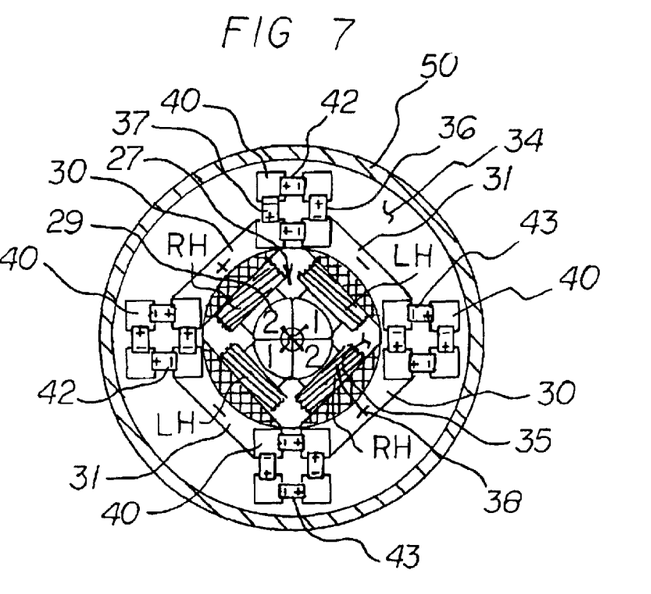
FIG. 7 is a cross-sectional view of a second embodiment of the invention which includes an armature which includes four armature winding portions and wherein the stator includes four stator magnet modules.
Figure 8:
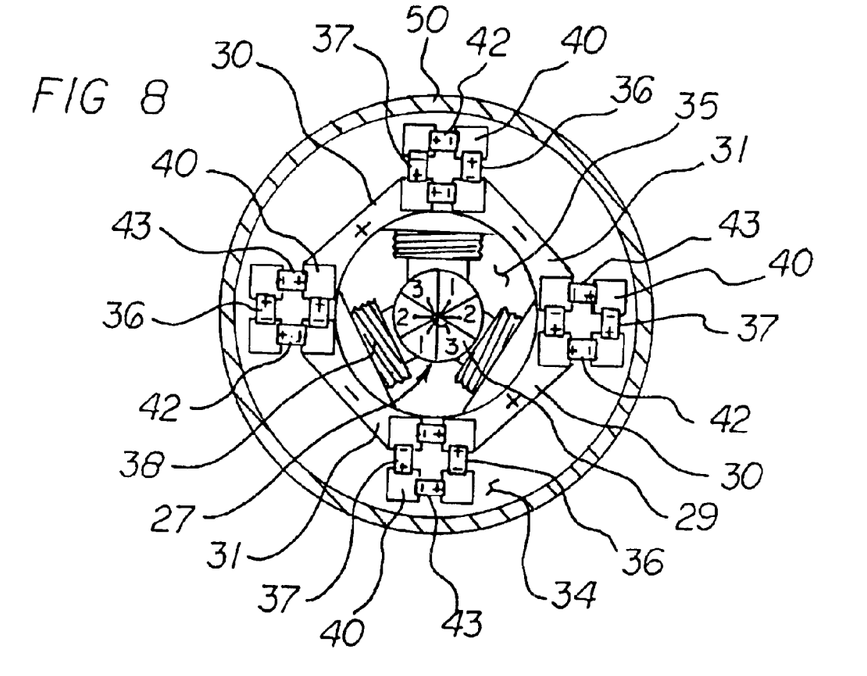
FIG. 8 is a cross-sectional view of a third embodiment of the invention which includes an armature which includes three armature winding portions, and wherein the stator includes four stator magnet modules.
Figure 9:
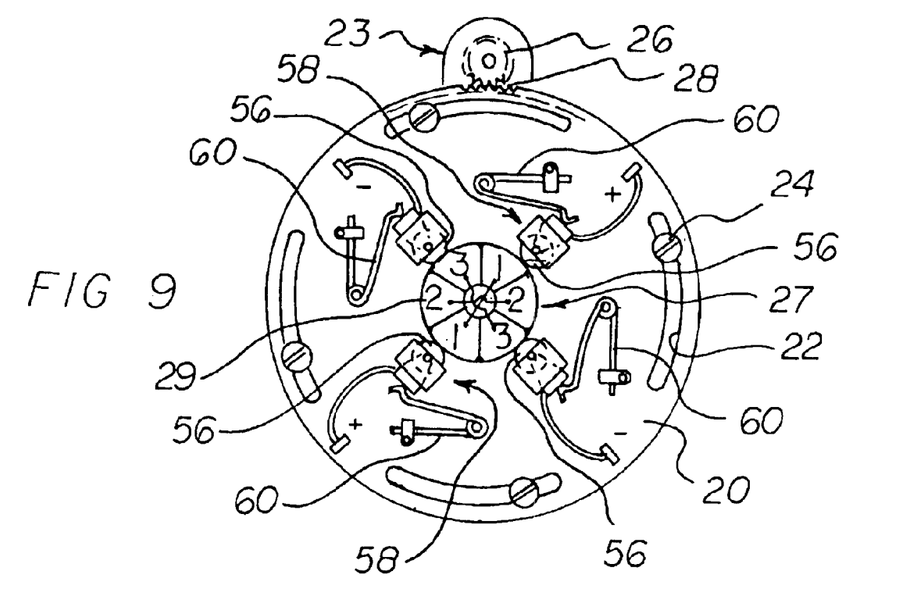
FIG. 9 is a rear view of a brush advance/retard mechanism used with the embodiment of the invention shown in FIG. 8, wherein four roller brush assemblies are shown.

A particular embodiment of the invention is shown in FIG. 6, which includes four stator magnet modules and intervening shunt members, all of which are arrayed as follows.

In FIG. 6, the farthest left stator magnet module includes a first row of first directional orientation carrier-embedded magnets 36, a second row of first directional orientation carrier-embedded magnets 36, a row of third directional orientation carrier-embedded magnets 42, and a row of fourth directional orientation carrier-embedded magnets 43. A shunt carrier block 40 is connected between the first row of the first directional orientation carrier-embedded magnets 36 and the row of fourth directional orientation carrier-embedded magnets 43, wherein the first row of the first directional orientation carrier-embedded magnets 36 is oriented perpendicular to the row of the fourth directional orientation carrier-embedded magnets 43. A shunt carrier block 40 is connected between the row of the fourth directional orientation carrier-embedded magnets 43 and the second row of the first directional orientation carrier-embedded magnets 36, wherein the row of the fourth directional orientation carrier-embedded magnets 43 is oriented perpendicular to the second row of the first directional orientation carrier-embedded magnets 36. A shunt carrier block 40 is connected between the second row of the first directional orientation carrier-embedded magnets 36 and the row of the third directional orientation carrier-embedded magnets 42, wherein the second row of the first directional orientation carrier-embedded magnets 36 is oriented perpendicular to the row of the third directional orientation carrier-embedded magnets 42. A shunt carrier block 40 is connected between the row of the third directional orientation carrier-embedded magnets 42 and the first row of the first directional orientation carrier-embedded magnets 36, wherein the row of the third directional orientation carrier-embedded magnets 42 is oriented perpendicular to the first row of the first directional orientation carrier-embedded magnets 36.

In FIG. 6, the topmost stator magnet module includes a row of second directional orientation carrier-embedded magnets 37, a first row of third directional orientation carrier-embedded magnets 42, a second row of third directional orientation carrier-embedded magnets 42, and a row of first directional orientation carrier-embedded magnets 36. A shunt carrier block 40 is connected between the row of the second directional orientation carrier-embedded magnets 37 and the first row of the third directional orientation carrier-embedded magnets 42, wherein the row of the second directional orientation carrier-embedded magnets 37 is perpendicular to the first row of the third directional orientation carrier-embedded magnets 42. A shunt carrier block 40 is connected between the first row of the third directional orientation carrier-embedded magnets 42 and the row of the first directional orientation carrier-embedded magnets 36, wherein the first row of the third directional orientation carrier-embedded magnets 42 is perpendicular to the row of the first directional orientation carrier-embedded magnets 36. A shunt carrier block 40 is connected between the row of the first directional orientation carrier-embedded magnets 36 and the second row of the third directional orientation carrier-embedded magnets 42, wherein the row of the first directional orientation carrier-embedded magnets 36 is perpendicular to the second row of the third directional orientation carrier-embedded magnets 42. A shunt carrier block 40 is connected between the second row of the third directional orientation carrier-embedded magnets 42 and the second directional orientation carrier-embedded magnets 37, wherein the second row of the third directional orientation carrier-embedded magnets 42 is perpendicular to the row of the second directional orientation carrier-embedded magnets 37.

In FIG. 6, the farthest right stator magnet module includes first row of second directional orientation carrier-embedded magnets 37, a second row of the second directional orientation carrier-embedded magnets 37, a row of fourth directional orientation carrier-embedded magnets 43, and a row of third directional orientation carrier-embedded magnets 42. A shunt carrier block 40 is connected between the first row of the second directional orientation carrier-embedded magnets 37 and the row of the fourth directional orientation carrier-embedded magnets 43, wherein the first row of the second directional orientation carrier-embedded magnets 37 is perpendicular to the row of the fourth directional orientation carrier-embedded magnets 43. A shunt carrier block 40 is connected between the row of the fourth directional orientation carrier-embedded magnets 43 and the second row of the second directional orientation carrier-embedded magnets 37, wherein the row of the fourth directional orientation carrier-embedded magnets 43 is perpendicular to the second row of the second directional orientation carrier-embedded magnets 37. A shunt carrier block 40 is connected between the second row of the second directional orientation carrier-embedded magnets 37 and the row of the third directional orientation carrier-embedded magnets 42, wherein the second row of the second directional orientation carrier-embedded magnets 37 is perpendicular to the row of the third directional orientation carrier-embedded magnets 42. A shunt carrier block 40 is connected between the row of the third directional orientation carrier-embedded magnets 42 and the first row of the second directional orientation carrier-embedded magnets 37, wherein the row of the third directional orientation carrier-embedded magnets 42 is perpendicular to the first row of the second directional orientation carrier-embedded magnets 37.

In FIG. 6, the bottom most stator magnet module includes a row of second directional orientation carrier-embedded magnets 37, a first row of fourth directional orientation carrier-embedded magnets 43, a second row of fourth directional orientation carrier-embedded magnets 43, and a row of first directional orientation carrier-embedded magnets 36. A shunt carrier block 40 is connected between the row of the second directional orientation carrier-embedded magnets 37 and the first row of the fourth directional orientation carrier-embedded magnets 43, wherein the row of the second directional orientation carrier-embedded magnets 37 is perpendicular to the first row of the fourth directional orientation carrier-embedded magnets 43. A shunt carrier block 40 is connected between the first row of the fourth directional orientation carrier-embedded magnets 43 and the row of the first directional orientation carrier-embedded magnets 36, wherein the second row of the fourth directional orientation carrier-embedded magnets 43 is perpendicular to the row of the first directional orientation carrier-embedded magnets 36, A shunt carrier block 40 is connected between the row of the first directional orientation carrier-embedded magnets 36 and the second row of the fourth directional orientation carrier-embedded magnets 43, wherein the row of the first directional orientation carrier-embedded magnets 36 is perpendicular to the second row of the fourth directional orientation carrier-embedded magnets 43. A shunt carrier block 40 is connected between the second row of the fourth directional orientation carrier-embedded magnets 43 and the row of the second directional orientation carrier-embedded magnets 37, wherein the second row of the fourth directional orientation carrier-embedded magnets 43 is perpendicular to the row of the second directional orientation carrier-embedded magnets 37.

Figure 14:
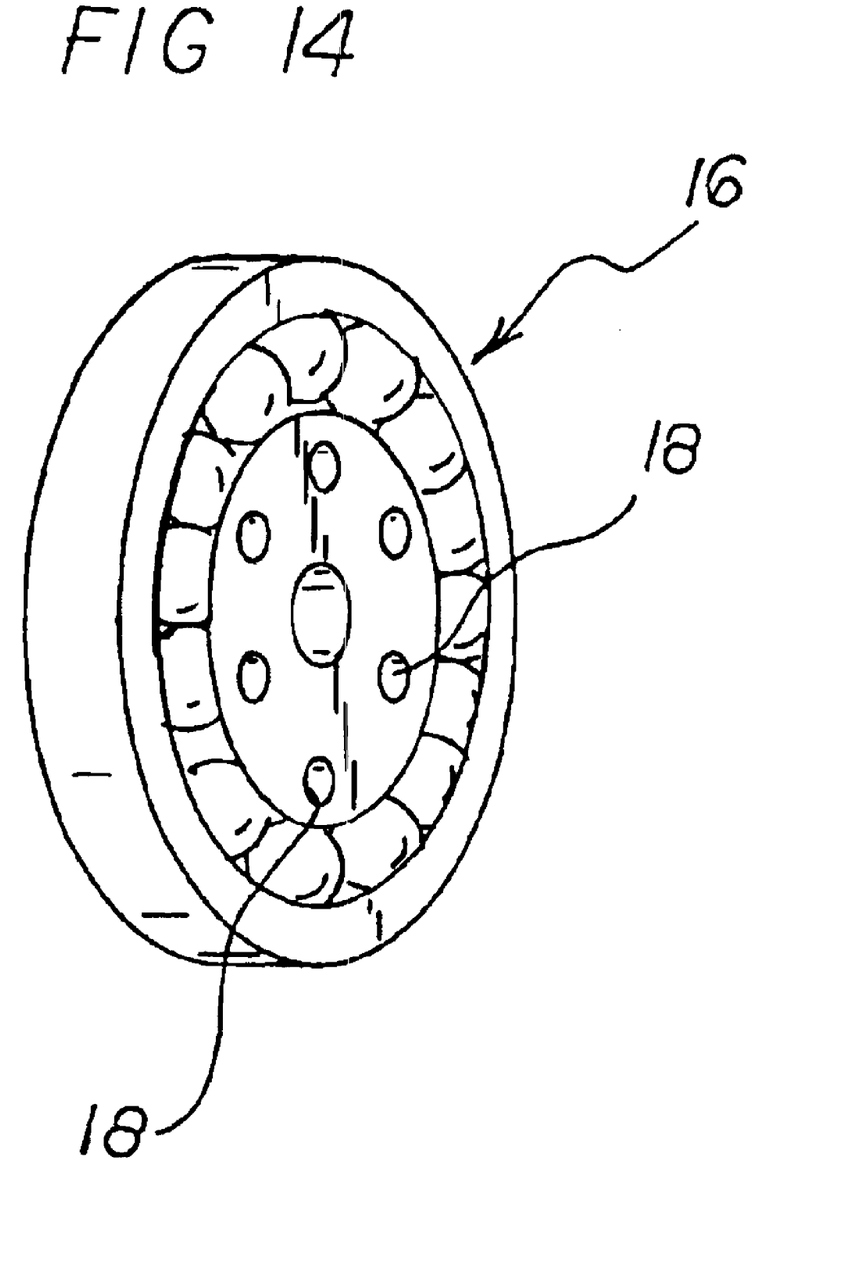
FIG. 14 is a perspective view of the tunnel bearing assembly according to the invention that includes wire-reception channels for electric wires that connect with contacts for the roller brush assemblies.

As shown in FIG. 14, a tunnel bearing assembly 16 is provided, supporting the armature, wherein the tunnel bearing assembly 16 includes wire-reception channels 18. The tunnel bearing assembly puts the bearings close to the armature for better stability and load supporting.

The components of the liquid cooled DC motor apparatus of the invention can be made from inexpensive and durable metal, ceramic, and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved DC motor apparatus that is low in cost, relatively simple in design and operation, and which is provided with a liquid cooling system. With the invention, a liquid cooled DC motor apparatus provides a stator comprised of a plurality of stator magnet modules. With the invention, a liquid cooled DC motor apparatus is provided which has an armature that includes additional armature pole portions. With the invention, a liquid cooled DC motor apparatus is provided which has opposite armature pole portions having the same winding configurations. With the invention, a liquid cooled DC motor apparatus is provided which employs roller brushes. With the invention, a liquid cooled DC motor apparatus provides a tunnel bearing assembly. With the invention, a liquid cooled DC motor apparatus provides a brush advance/retard mechanism.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A DC motor apparatus, comprising:
   a motor housing assembly which includes an outer chamber portion and an inner, armature-reception chamber portion,
   at least one pair of stator magnet modules housed within said outer chamber portion,
   at least one pair of shunt members housed within said outer chamber portion between said stator magnet modules,
   an armature housed in said inner, armature-reception chamber portion, wherein said armature is centrally located with respect to said stator magnet modules, such that said stator magnet modules are arrayed peripherally around said armature, wherein said armature includes at least one pair of armature pole portions, wherein both of said at least one pair of armature pole portions are wound with same-directional windings,
   a commutator connected to said armature, wherein said commutator includes at least one pair of commutator contacts, wherein the number of pairs of commutator contacts is equal to the number pairs of said armature pole portions, and
   a brush advance/retard mechanism supported by said motor housing assembly, wherein said brush advance/retard mechanism includes roller brushes for contacting said commutator contacts.

2. The apparatus of claim 1 wherein said stator magnet modules include permanent magnets.

3. The apparatus of claim 1 wherein:
   said motor housing assembly includes an outer liquid-tight coolant chamber and said inner, armature-reception chamber portion,
   said at least one pair of stator magnet modules are housed within said liquid-tight coolant chamber, and
   said at least one pair of shunt members are housed within said liquid-tight coolant chamber between said stator magnet modules.

4. The apparatus of claim 3, further including:
   housing-to-pump conduits connected to said liquid-tight coolant chamber,
   a coolant pump connected to said housing-to-pump conduits,
   a pump-to-radiator conduit connected to said coolant pump,
   a coolant fluid radiator connected to said pump-to-radiator conduit, and
   radiator-to-housing conduits connected between said coolant fluid radiator and said liquid-tight coolant chamber.

5. The apparatus of claim 1 wherein said shunt members include at least one north-pole-to-north-pole, module-to-module shunt member and at least one south-pole-to-south-pole, module-to-module shunt member.

6. The apparatus of claim 1 wherein said same-directional windings include right-handed windings.

7. The apparatus of claim 1 wherein said same-directional windings include left-handed windings.

8. The apparatus of claim 1 wherein said motor housing assembly includes an outer longitudinal housing portion, an inner longitudinal housing portion, a first transverse housing portion, and a second transverse housing portion.

9. The apparatus of claim 8 wherein said outer longitudinal housing portion, said inner longitudinal housing portion, a portion of said first transverse housing portion, and a portion of said second transverse housing portion define said liquid-tight coolant chamber.

10. The apparatus of claim 8 wherein said inner longitudinal housing portion, a portion of said first transverse housing portion, and a portion of said second transverse housing portion define said inner, armature-reception chamber portion.

11. The apparatus of claim 1 wherein said brush advance/retard mechanism includes:
   a roller brush support plate connected to said motor housing assembly, wherein said roller brush support plate includes plate adjustment slots, and wherein said roller brush support plate includes peripheral plate teeth, plate guide fasteners received in said plate adjustment slots and connected to said motor housing assembly, roller brush assemblies connected to said roller brush support plate, wherein said roller brush assemblies include said roller brushes and brush bias springs for biasing said roller brushes against said commutator contacts, plate drive assembly, supported by said motor housing assembly, for adjusting said roller brush support plate, wherein aid plate drive assembly includes a brush advance/retard gear for engaging said peripheral plate teeth.

12. The apparatus of claim 1 wherein each of said stator magnet module includes:

a plurality of cylindrical magnets, and a plurality of shunt blocks retaining said cylindrical magnets.

13. The apparatus of claim 1 wherein at least one of said stator magnet modules includes:

a first row of first directional orientation carrier-embedded magnets, a second row of first directional orientation carrier-embedded magnets, a row of third directional orientation carrier-embedded magnets, a row of fourth directional orientation carrier-embedded magnets, a shunt carrier block connected between said first row of said first directional orientation carrier-embedded magnets and said row of fourth directional orientation carrier-embedded magnets, wherein said first row of said first directional orientation carrier-embedded magnets is oriented perpendicular to said row of said fourth directional orientation carrier-embedded magnets, a shunt carrier block connected between said row of said fourth directional orientation carrier-embedded magnets and said second row of said first directional orientation carrier-embedded magnets, wherein said row of said fourth directional orientation carrier-embedded magnets is oriented perpendicular to said second row of said first directional orientation carrier-embedded magnets, a shunt carrier block connected between said second row of said first directional orientation carrier-embedded magnets and said row of said third directional orientation carrier-embedded magnets, wherein said second row of said first directional orientation carrier-embedded magnets is oriented perpendicular to said row of said third directional orientation carrier-embedded magnets, and a shunt carrier block connected between said row of said third directional orientation carrier-embedded magnets and said first row of said first directional orientation carrier-embedded magnets, wherein said row of said third directional orientation carrier-embedded magnets is oriented perpendicular to said first row of said first directional orientation carrier-embedded magnets.

14. The apparatus of claim 1 wherein at least one of said stator magnet modules includes:

a row of second directional orientation carrier-embedded magnets, a first row of third directional orientation carrier-embedded magnets, a second row of third directional orientation carrier-embedded magnets, a row of first directional orientation carrier-embedded magnets, a shunt carrier block connected between said row of said second directional orientation carrier-embedded magnets and said first row of said third directional orientation carrier-embedded magnets, wherein said row of said second directional orientation carrier-embedded magnets is perpendicular to said first row of said third directional orientation carrier-embedded magnets, a shunt carrier block connected between said first row of said third directional orientation carrier-embedded magnets and said row of said first directional orientation carrier-embedded magnets, wherein said first row of said third directional orientation carrier-embedded magnets is perpendicular to said row of said first directional orientation carrier-embedded magnets, a shunt carrier block connected between said row of said first directional orientation carrier-embedded magnets and said second row of said third directional orientation carrier-embedded magnets, wherein said row of said first directional orientation carrier-embedded magnets is perpendicular to said second row of said third directional orientation carrier-embedded magnets, a shunt carrier block connected between said second row of said third directional orientation carrier-embedded magnets and said second directional orientation carrier-embedded magnets, wherein said second row of said third directional orientation carrier-embedded magnets is perpendicular to said row of said second directional orientation carrier-embedded magnets.

15. The apparatus of claim 1 wherein at least one of said stator magnet modules includes:

a first row of second directional orientation carrier-embedded magnets, a second row of said second directional orientation carrier-embedded magnets, a row of fourth directional orientation carrier-embedded magnets, a row of third directional orientation carrier-embedded magnets, a shunt carrier block connected between said first row of said second directional orientation carrier-embedded magnets and said row of fourth directional orientation carrier-embedded magnets, wherein said first row of said second directional orientation carrier-embedded magnets is perpendicular to said row of said fourth directional orientation carrier-embedded magnets, a shunt carrier block connected between said row of said fourth directional orientation carrier-embedded magnets and said second row of said second directional orientation carrier-embedded magnets, wherein said row of said fourth directional orientation carrier-embedded magnets is perpendicular to said second row of said second directional orientation carrier-embedded magnets, a shunt carrier block connected between said second row of said second directional orientation carrier-embedded magnets and said row of third directional orientation carrier-embedded magnets, wherein said second row of said second directional orientation carrier-embedded magnets is perpendicular to said row of said third directional orientation carrier-embedded magnets, and a shunt carrier block connected between said row of said third directional orientation carrier-embedded magnets and said first row of said second directional orientation carrier-embedded magnets, wherein said row of said third directional orientation carrier-embedded magnets is perpendicular to said first row of said second directional orientation carrier-embedded magnets.

16. The apparatus of claim 1 wherein at least one of said stator magnet modules includes:

a row of second directional orientation carrier-embedded magnets, a first row of fourth directional orientation carrier-embedded magnets, a second row of fourth directional orientation carrier-embedded magnets, a row of first directional orientation carrier-embedded magnets, a shunt carrier block connected between said row of said second directional orientation carrier-embedded magnets and said first row of said fourth directional orientation carrier-embedded magnets, wherein said row of said second directional orientation carrier-embedded magnets is perpendicular to said first row of said fourth directional orientation carrier-embedded magnets, a shunt carrier block connected between said first row of said fourth directional orientation carrier-embedded magnets and said row of said first directional orientation carrier-embedded magnets, wherein said second row of said fourth directional orientation carrier-embedded magnets is perpendicular to said row of said first directional orientation carrier-embedded magnets, a shunt carrier block connected between said row of said first directional orientation carrier-embedded magnets and said second row of said fourth directional orientation carrier-embedded magnets, wherein said row of said first directional orientation carrier-embedded magnets is perpendicular to said second row of said fourth directional orientation carrier-embedded magnets, and a shunt carrier block connected between said second row of said fourth directional orientation carrier-embedded magnets and said row of said second directional orientation carrier-embedded magnets, wherein said second row of said fourth directional orientation carrier-embedded magnets is perpendicular to said row of said second directional orientation carrier-embedded magnets.

17. The apparatus of claim 1, further including:

a tunnel bearing assembly, supporting said armature, wherein aid tunnel bearing assembly includes wire-reception channels.

* * * * *